(12) United States Patent
Ashley et al.

(10) Patent No.: US 9,154,507 B2
(45) Date of Patent: Oct. 6, 2015

(54) AUTOMATED ROLE AND ENTITLEMENTS MINING USING NETWORK OBSERVATIONS

(71) Applicant: International Business Machines Corporation, Armonk, NY (US)

(72) Inventors: Paul A. Ashley, Toowong (AU); John W. Court, Carrara (AU); Christopher J. Hockings, Burleigh Waters (AU)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 13/652,188

(22) Filed: Oct. 15, 2012

(65) Prior Publication Data

US 2014/0109168 A1    Apr. 17, 2014

(51) Int. Cl.
    *G06F 17/00* (2006.01)
    *H04L 29/06* (2006.01)
    *G06F 21/55* (2013.01)

(52) U.S. Cl.
    CPC ............ *H04L 63/102* (2013.01); *G06F 21/552* (2013.01); *H04L 63/20* (2013.01); *G06F 2221/2141* (2013.01); *G06F 2221/2145* (2013.01); *G06F 2221/2149* (2013.01)

(58) Field of Classification Search
    CPC ...... H04L 63/102; H04L 63/20; G06F 21/552
    USPC ....................... 726/1, 5, 22; 713/160; 709/224
    See application file for complete search history.

(56) References Cited

U.S. PATENT DOCUMENTS

| | | | |
|---|---|---|---|
| 2006/0026679 A1* | 2/2006 | Zakas ............................. | 726/22 |
| 2006/0047657 A1* | 3/2006 | Frieder et al. .................... | 707/9 |
| 2007/0214352 A1* | 9/2007 | Convery et al. ............... | 713/153 |
| 2007/0240231 A1* | 10/2007 | Haswarey et al. .............. | 726/28 |
| 2008/0016104 A1 | 1/2008 | Kuehr-McLaren et al. | |
| 2008/0052102 A1 | 2/2008 | Taneja et al. | |
| 2008/0168063 A1* | 7/2008 | Whitson .......................... | 707/9 |
| 2009/0077659 A1* | 3/2009 | Segawa .......................... | 726/21 |
| 2009/0144803 A1 | 6/2009 | Schreiber et al. | |

(Continued)

FOREIGN PATENT DOCUMENTS

WO    WO2008143985    11/2008

OTHER PUBLICATIONS

Frias-Martinez, "A Network Access Control Mechanism Based on Behavior Profiles," Proceedings—Annual Computer Security Applications Conference, ACSAC, p. 3-12, 2009.

(Continued)

*Primary Examiner* — Techane Gergiso
(74) *Attorney, Agent, or Firm* — Jeffrey S. LaBaw; David H. Judson (57) ABSTRACT

A role and entitlements mining system uses network intelligence to facilitate role definition. The system records traffic on a network. The traffic is analyzed to identify the user and application involved. The matched data is then provided to an analytics engine, which analyzes that data to attempt to derive an initial set of one or more roles and the application entitlements for each role. Each role derived by the analytics engine identifies one or more users who are identified as belonging to the role, as well as one or more application entitlements. Preferably, one or more directory services are then interrogated for known group and user relationships to detect whether the roles identified by the analytics engine can be modified or enriched. Evaluation of the known group and user relationships provides a way to identify a more granular set of role definitions. A role-based access control policy is then generated.

22 Claims, 6 Drawing Sheets

(56) References Cited

U.S. PATENT DOCUMENTS

2009/0241166 A1* 9/2009 Thurm et al. ............... 726/1
2010/0067390 A1 3/2010 Pereira Valente et al.
2011/0162034 A1* 6/2011 Nagaratnam et al. ........ 726/1
2011/0271102 A1* 11/2011 Smith ......................... 713/160
2012/0144187 A1* 6/2012 Wei et al. .................... 713/152
2012/0246098 A1* 9/2012 Chari et al. .................. 706/12
2013/0064247 A1* 3/2013 Song et al. ................... 370/392
2013/0111583 A1* 5/2013 Hernandez et al. .......... 726/21
2014/0075492 A1* 3/2014 Kapadia et al. ............... 726/1

* cited by examiner

```
<role-list>
    <role>
            <identifier>Role 1</identifier>
            <users>Paul, Chris, John</users>
            <entitlements>
                    <application>
                            <description>TAMeb</description>
                    </application>
                    <application>
                            <description>Matlab</description>
                    </application>
                    <application>
                            <description>Email</description>
                    </application>
            </entitlements>
    </role>
    .
    .
    .
</role-list>
```

*FIG. 4*

```
<role-list>
    <role>
            <identifier>Principal Engineer</identifier>
            <entitlements>
                    <application>
                            <description>TAMeb</description>
                            <group>A</group>
                            <group>B</group>
                    </application>
                    <application>
                            <description>Matlab</description>
                    </application>
                    <application>
                            <description>Email</description>
                    </application>
                    <application>
                            <description>Microsoft Project</description>
                    </application>
            </entitlements>
    </role>
```

FROM FIG. 5A

```
<role>
        <identifier>Finance</identifier>
        <entitlements>
                <application>
                        <description>SAP</description>
                        <group>D</group>
                        <group>E</group>
                </application>
                <application>
                        <description>Email</description>
                </application>
                <application>
                        <description>Oracle</description>
                </application>
        </entitlements>
</role>
<role>
        <identifier>Engineer</identifier>
        <entitlements>
                <application>
                        <description>TAMeb</description>
                </application>
                <application>
                        <description>Matlab</description>
                </application>
                <application>
                        <description>Email</description>
                </application>
        </entitlements>
</role>
<role>
        <identifier>Senior Engineer</identifier>
        <entitlements>
                <application>
                        <description>TAMeb</description>
                        <group>A</group>
                        <group>C</group>
                </application>
        </entitlements>
</role>
</role-list>
```

*FIG. 5B*

| Role | Entitlements |
| --- | --- |
| Engineer | Tivoli Access Manager for e-business (TAMeb)<br>Matlab<br>Email |
| Principal Engineer | TAMeb + TAMeb groups A, B<br>Matlab<br>Email<br>Microsoft Project |
| Finance | SAP + SAP groups D, E<br>Oracle<br>Email |
| Senior Engineer | TAMeb + TAMeb groups A, C |

AUTOMATED ROLE AND ENTITLEMENTS MINING USING NETWORK OBSERVATIONS

BACKGROUND

1. Technical Field

This disclosure relates generally to security systems for computer networks.

2. Background of the Related Art

When defining an access control policy for an organization a common approach is to implement Role Based Access Control (RBAC). Using RBAC, entitlements to perform particular functions are assigned to roles instead of directly to users. The way a user gets the entitlements is by being assigned to roles or requesting membership of the role. Thus, to define an RBAC-based policy for an organization, an understanding of the user roles and the entitlements for those roles is required. Once this information is understood for an organization, the appropriate RBAC policy can be defined and deployed to an Identity Management system, such as IBM® Tivoli® Identity Manager™. Use of such tools greatly simplifies access management as compared with directly defining a user-to-entitlement relationship.

A problem, however, is how to create an initial RBAC policy for an organization. A particular issue is how to discover the roles and the entitlements for those roles, especially in a large organization. There are a number of common approaches that together are used to address these issues and to facilitate the defining of the RBAC policy. A typical approach involves several manual steps including interviewing each employee (about their job function and application entitlements), interviewing management (asking their view on employee roles and entitlements), performing system review (e.g., examining application user directories for user entitlements such as group membership), reviewing documentation (e.g., examining documents that define the management structure of an organization and job definitions), and evaluating best practices (i.e., trying to use roles and entitlements defined in other organizations and then tailoring these to the current enterprise). These approaches, however, are very expensive and time-consuming, and they rarely result in a meaningful RBAC policy. Indeed, it is not uncommon for an enterprise to embark on a role-defining exercise and then much later decide that no useful policy has resulted (in which case the entire exercise may then be abandoned). This is because manual processes just are not efficient at discovering the true roles and entitlements of an organization.

Another problem is that, with respect to an identity solution, the definition of what is or is not a role is often confusing (especially to individuals being questioned about employee "roles"), because most organizations use the term to identify job description rather than the person's need for access to systems. Indeed, some individuals being interviewed about roles may not even understand or appreciate the distinction (between an IT-based RBAC role and an employment role), which further skews any results toward a negative or un-useful outcome.

It is also known in the art to provide automated organizational role modeling for role based access controls. This approach inspects permission settings within IT systems, and these settings are then analyzed to determine whether there are any patterns within these permissions. Automated role modeling using the above-described approach, however, tends to produce roles that track existing policy set by the organization as opposed to roles that more closely indicate the actual behavior of users within the organization. Another approach, which typically is implemented in identity management systems, provides for role mining capabilities and the ability to model new roles based on policy information. That approach, however, typically relies upon static information.

There remains a need in the art to provide enhanced role and entitlements mining that addresses these and other problems.

BRIEF SUMMARY

According to this disclosure, role mining is facilitated using network observations. In particular, network traffic inspection technology records user access to one or more applications. This information is then used to determine the roles and associated entitlements in use within the Information Technology (IT) services within an organization. According to this approach, a traffic collection system records traffic on a network. The traffic on a particular connection is then analyzed to identify the user and application involved. The matched data is then provided to an analytics engine, which analyzes that data to attempt to derive one or more roles (and the application entitlements for each role). Each role derived by the analytics engine identifies one or more users who are identified as belonging to the role, as well as one or more application entitlements. Preferably, existing directory services (whether local or remote) are then interrogated for known group and user relationships to detect whether the roles identified by the analytics engine (as determined from the collected network traffic) should be modified or enriched. Evaluation of the known group and user relationships provides a way to identify a more granular set of role definitions. At this step, the existing directory service is accessed and the actual groups for the users (that have been associated with the role) are extracted and evaluated; based on this evaluation, the role entitlements may be changed or augmented. From this process, which is preferably automated, an output in the form of an XML role-based access control policy is generated. This RBAC policy may then be provided to an identity management system to create an initial role and entitlements policy for the system.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
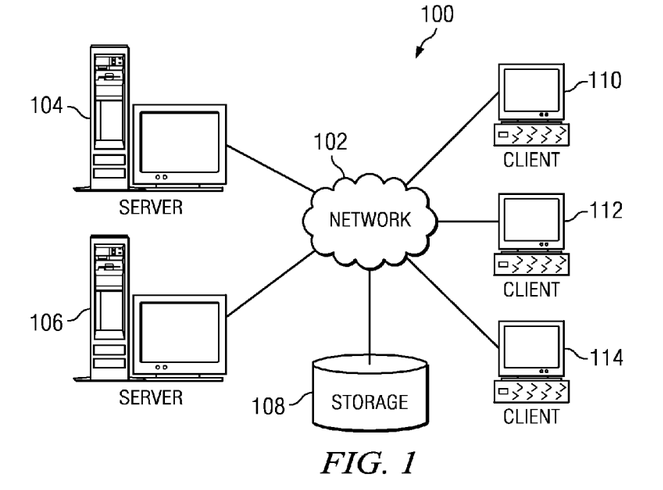
FIG. 1 depicts an exemplary block diagram of a distributed data processing environment in which exemplary aspects of the illustrative embodiments may be implemented.
Figure 2:
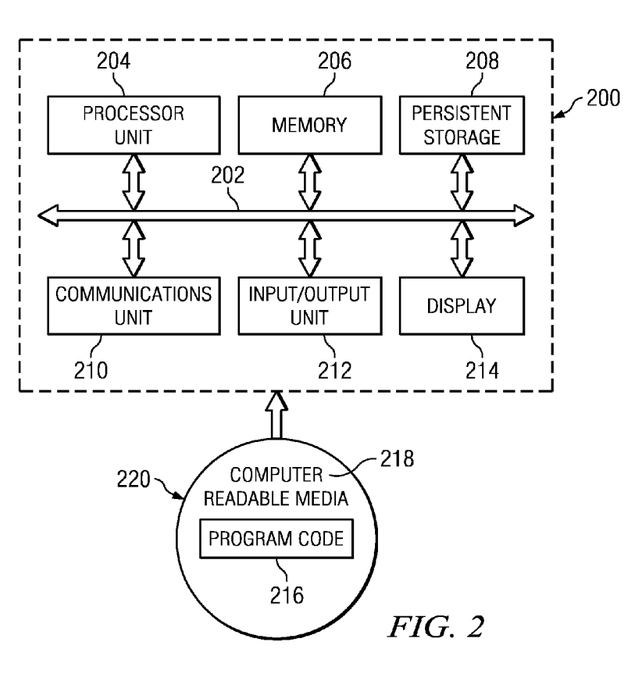
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of further background, role-based access control (RBAC) for enforcing security within an enterprise is well-known in the prior art. Typically, a role is a set of permissions that are enabled for an organizational agent that performs certain job functions. Role engineering is the process of defining a set of roles for the organization and assigned permissions to those roles. Role engineering may be carried out in a top-down manner, or a bottom-up manner. In a top-down approach, roles are defined by analyzing business processes and identifying the one or more functions that comprise each such process; a set of permissions on information systems are then associated with each function. Typically, the top-down approach begins by defining a job function; a role is then created for this function by associating whatever permissions are needed. Role mining can be used in conjunction with this top-down approach to identify proposed roles that can be examined to determine if they satisfy the business process function to which they might be associated. In contrast, in a bottom-up approach, existing permission assignments are used to formulate roles. Typically, one or more permission assignments are aggregated and associated with a role, and the process may be automated for efficiency.

A typical RBAC model is based on role names, and assignment of users to those roles. The associated access control is based on these roles. An RBAC-based role typically has meaning only within a given context (i.e., within a Company in which the role is defined, with respect to a given application system used in the Company, or the like). Moreover, role-based access control usually requires centralized management of user-to-role and permission-to-role assignments and, as a consequence, it is not well-suited for distributed environments.

RBAC policy is used to provision accounts to end systems. As part of this provisioning exercise, and as described generally above, users may be placed into groups. As noted, the end systems typically rely on group membership to determine what access rights that a particular user will have within the system/application.

Automated Role and Entitlements Mining Using Network Observations

With the above as background, the techniques of this disclosure are now described. As described above, according to this approach role mining is facilitated using network observations. In particular, preferably network traffic inspection technology is used or leveraged to record user access to one or more applications. This information is then used to determine the roles and associated entitlements in use within an information technology (IT) system, preferably by augmenting or enriching roles (defined using the network traffic data) with information about group and user relationships. The result is a role-based access control policy that may then be enforced in the enterprise by known systems, such as an identity manager.

As will be described, a role and entitlements mining system according to this disclosure records traffic on a network. The traffic is analyzed to identify the user and application involved. The matched data is then provided to an analytics engine, which analyzes that data to attempt to derive an initial set of one or more roles and the application entitlements for each role. Each role derived by the analytics engine identifies one or more users who are identified as belonging to the role, as well as one or more application entitlements. Preferably, one or more directory services are then interrogated for known group and user relationships to detect whether the roles identified by the analytics engine can be modified or enriched. Evaluation of the known group and user relationships provides a way to identify a more granular set of role definitions. A role-based access control policy is then generated.

Figure 3:
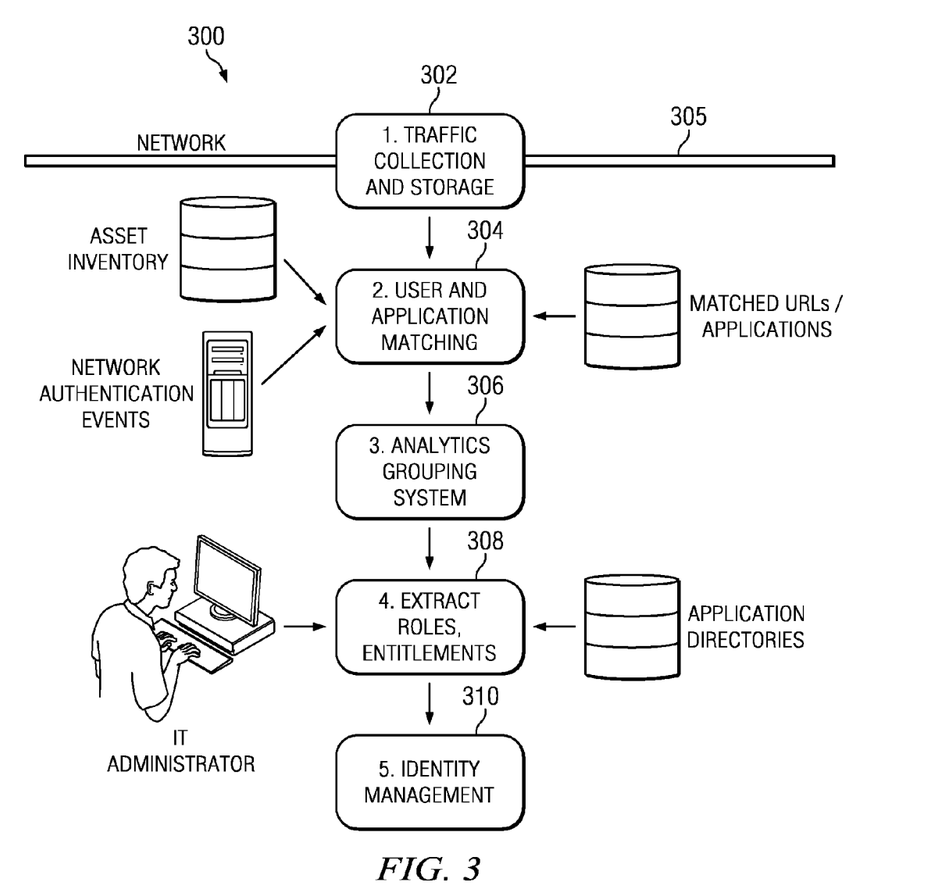
FIG. 3 illustrates an automated role and entitlements mining system according to this disclosure.

FIG. 3 illustrates the basic components of an automated role and entitlements mining system 300 that implements the above-described functionality. The system 300 comprises a set of sub-systems that may be implemented together in an integrated manner, or by executing the individual sub-systems separately. Each sub-system may comprise one or more components or functions that are implemented in one or more machines, devices, programs, processes or other computing entity. Sub-systems (or individual entities therein) may be co-located or remote from one another, and the functionality of a particular sub-system (or an individual entity therein) may be shared. Thus, and generalizing, the various features and functions of the system 300 may be implemented by any combination of hardware, software, machines, devices, operating environments (including cloud-based), and the like, as necessary or desired.

Each of the sub-systems (or, more generally, the functions) of the automated role and mining system of this disclosure are now described.

As noted above, the role mining technique of this disclosure uses network intelligence to inform the role definition process. To this end, the traffic collection and storage sub-system 302 is used to record traffic on a network 305, such as an enterprise network. The particular type of network is not limited, however, as the approach herein may be implemented on or in association with any network within or associated with a set of users and applications for which the role mining is desired to be accomplished. Thus, the network may be an internal network, a network partially within an organization boundary, a private network, a wireless or wire-line network, or the like. The traffic collection and storage sub-system 302 preferably uses technology (whether custom or off-the-shelf) that can identify and extract related connections, sessions and packets. One type of off-the-shelf technology that may be used for this purpose is known as deep packet inspection (DPI) or deep session inspection (DSI). DPI/DSI inspection engines are known in the art and are an example of a device that performs traffic capture and initial summary analysis of the captured data. Preferably, the data collected by the traffic analysis is persisted in a data store or storage sub-system, such as a relational database, data array, linked list, or the like. Typically, the following information is stored for each connection: source IP address and port number, destination IP address and port number, and HTTP/S request information (for web requests) or partial traffic capture for other types of applications (e.g., the first 100 data packets for a thick client application). Of course, the nature and type of information that are collected by the traffic collection and storage sub-system 302 will vary depending on the type of network, client, and application. This sub-system thus provides traffic intelligence that will be used to generate an initial set of roles (sometimes referred to herein as "candidate" roles). As noted above, the traffic collection and storage sub-system is not required to be on a physical network, and it may also be implemented as a software component running inside a virtualized network environment on a large server.

In particular, and referring back to FIG. 3, the user and application matching sub-system 304 takes the summary information for each connection (as identified and provided by the traffic collection sub-system 302), and it analyzes that information to identify the user and application involved. Identification of the user and application data then facilitates the creation of the initial set of roles and entitlements, as will be described. To identify the user creating the network traffic, preferably the user and application matching sub-system 304 implements one or more techniques to map the source IP address data to a real user identity. One approach identifies the user from authentication data, which data may be obtained from some network authentication device or system (e.g., login events at a directory service (e.g., Active Directory) that shows the user identity and an associated IP address (e.g., a Network Authentication Event). In the alternative, the authentication data may be obtained by manual intervention, e.g., by having the user authenticate to the traffic collection sub-system itself. Yet another alternative is to use or leverage a systems management process to provide relevant data, such as a binding of a source IP address to a MAC address on a computer associated with a user having a one or more accounts in the enterprise. Regardless of which technique is used (and these techniques are not intended to be limiting), the result is a user identifier, such as a name, userID, or the like.

The user and application matching sub-system 304 identifies the one or more application(s) in use (as evidenced by the traffic data) using one or more techniques. Thus, in one approach, the application is identified by offline inspection, e.g., using a web matching engine that identifies that some request URL matches a particular application or application part. Another approach is to implement a real-time inspection to analyze characteristics of the traffic and thus ascertain the application. Regardless of which approach is used (and these approaches are not intended to be limiting), the result is an application identifier.

The user and application determination may be performed by separate entities, or a single composite entity that comprises the user and application matching sub-system 304. A next-generation (next-gen) firewall is an example of a device that performs both user and application matching in the manner described. The output of this sub-system typically is a tuple comprising: a user identifier (e.g., Paul), a destination IP address (e.g., 10.1.2.1), and an application identifier (e.g., TAMeb®). The destination address is needed to distinguish between multiple instances of applications, as it is not unusual for an organization to have separate instances deployed and executing within the enterprise computing environment. Where multiple instances are not implemented, this data may be omitted.

Figure 4:
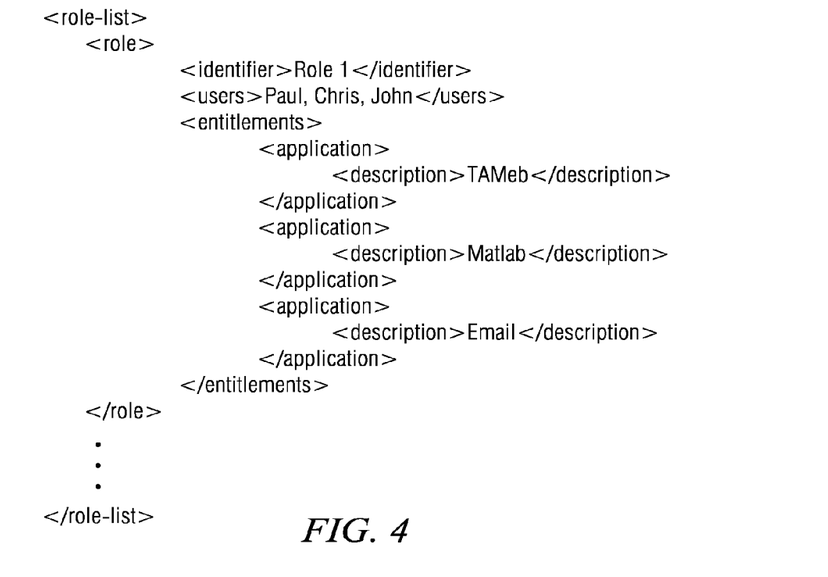
FIG. 4 illustrates a representative sample role generated by the analytics engine of FIG. 3.

Referring back to FIG. 3, the analytics grouping sub-system 306 comprises an analytics engine that receives that data (namely, the user and application for a particular connection) generated by the user and application matching sub-system 304. Generally, this component finds patterns from client systems and matches those patterns with application use. From these patterns, roles and associated application entitlements are then derived. This type of matching or grouping is a common function to known behavioral analytics systems, which systems may be used for this purpose. The output of the analytics grouping sub-system 306 is a role list that identifies one or more candidate roles, wherein each role in the role list is then defined by an identifier (a name of the candidate role), a set of one or more users who have been found (by the analytics engine) to satisfy the defined role, and a set of one or more application entitlements that have been found (by the analytics engine) to satisfy the role definition. FIG. 4 illustrates a representative role-list in an XML format. This particular role-list 400, which is merely representative, identifies a single candidate role, called Role1. Based on the network traffic data and the pattern matching, the analytics engine has determined that the role has three (3) users (e.g., Paul, Chris and John), and several application entitlements (namely, TAMeb®, Matlab®, and e-mail). Of course, the above role is merely exemplary. As noted above, the analytics engine creates the role based on the network traffic data as processed by the user and application match data.

Referring back to FIG. 3, the role and entitlement extraction sub-system 308 receives the role-list and provides further processing based on user-specific application entitlements for the application. Preferably, sub-system 308 provides a way for the candidate roles (as observed from the network traffic) to be further refined using actual application instances in use. This operation typically requires the component to interrogate user or group repositories/directories with respect to the application(s) being monitored. To this end, preferably the sub-system is configured (e.g., upon initialization) or can otherwise obtain at run-time configuration information that identifies each directory in the organization. Each such directory typically stores information about a particular application and the user(s) or group(s) of users that have entitlements to use that application (or an application instance). A representative directory is an LDAP directory. The directory is adapted to be queried and returns user/group data concerning the application in question. For each candidate role in the role-list, the role and entitlement extraction sub-system 308 queries one or more directories to obtain group information such as which user(s) are members of which group(s). Based on the information returned from the directory queries, the role and entitlement extraction sub-system may determine that a particular grouping should be enforced within the role. In other words, the information returned from the directory queries may be used to augment, modify, supplement or otherwise enrich the entitlement policy set forth in the role definition.

The directory services queried are not limited to those within the organizational boundary. The role and entitlement extraction sub-system 308 may also query services residing beyond the organization's boundary (e.g., cloud-based, B2B, and the like).

Figure 5A:
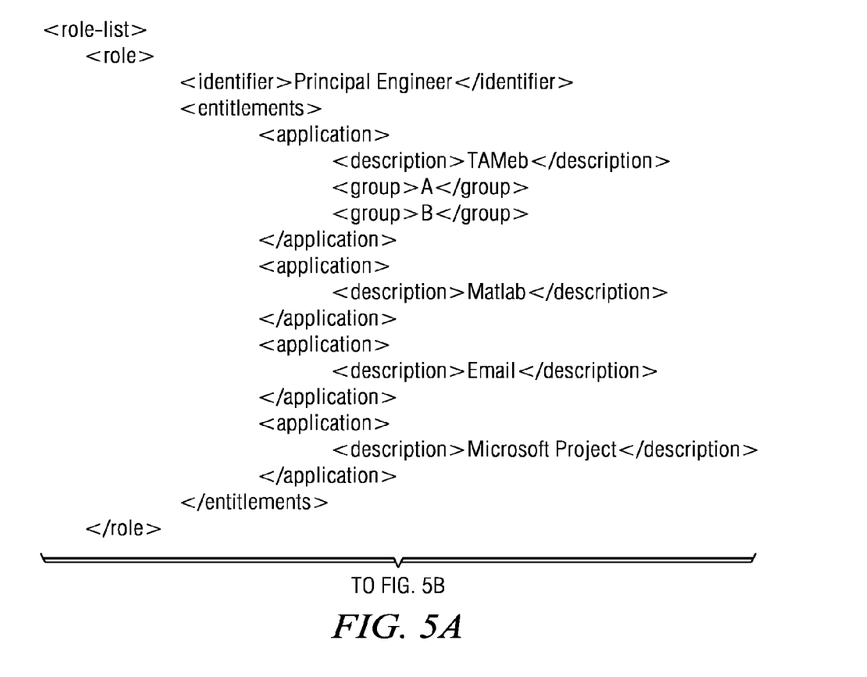
FIGS. 5A-5B illustrate an enriched set of roles generated as a result of examining existing user and group data.
Figure 5B:
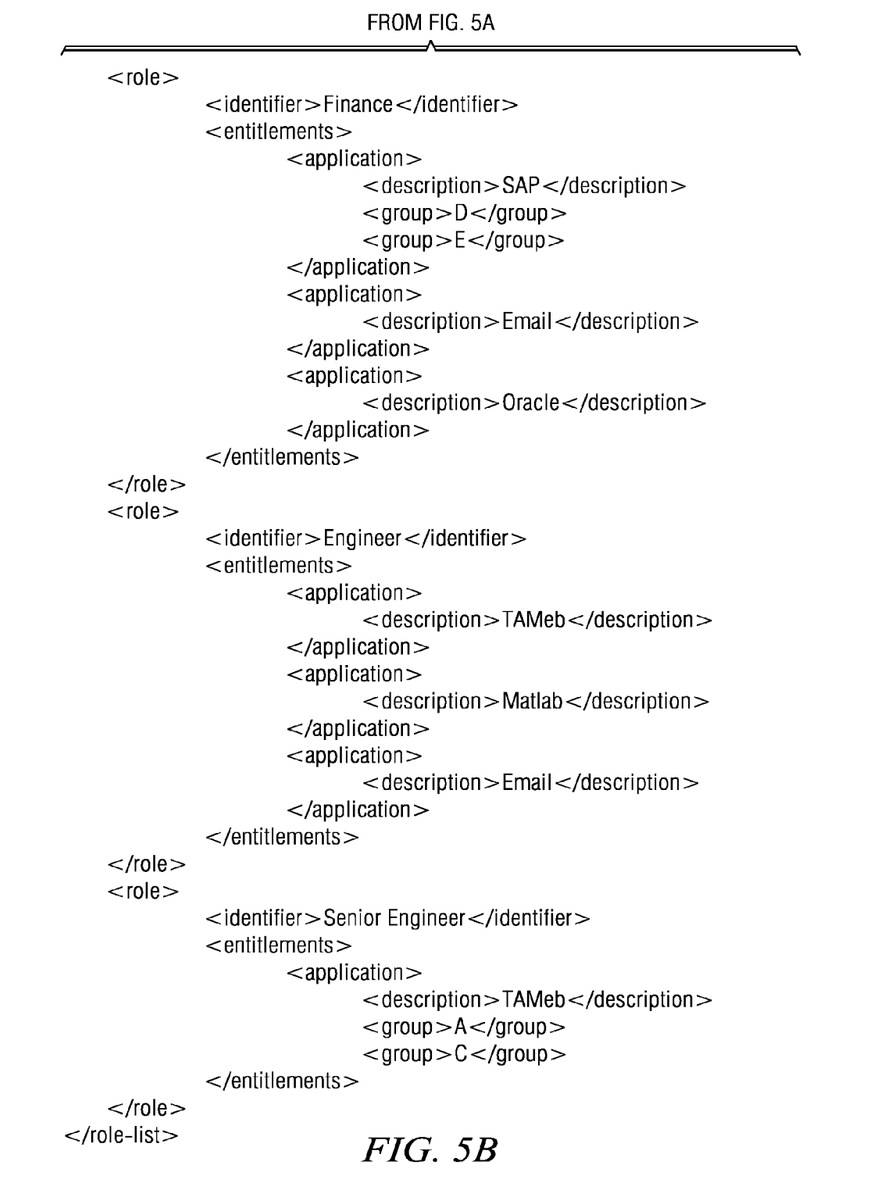

As an example of this operation, it is assumed that the system has just the role identified in the XML snippet shown in FIG. 4. Taking the example of the TAMeb application, one or more directory servers are then probed to extract the actual groups for users, in this example users Paul, Chris and John. These probes also return one or more role identifiers that are used within the existing directory system(s). Based on the one or more queries, the sub-system has received information about these role identifiers, as well as information that, with respect to this application, Paul and Chris share the group of A and B (for the role of Principal Engineer), and Chris and John share the group of A and C (for the role of Senior Engineer). Based on the identifiers and group data returned, the sub-system then determines that these groupings should be applied to the XML entitlements policy; as a result, the sub-system 308 creates an enriched role list that includes several additional roles and entitlements based at least in part on the returned information. In this particular example, the resulting role-list is shown in FIGS. 5A-5B. As can be seen, this role list includes several roles: Principal Engineer, Finance, Engineer and Senior Engineer. The application entitlements for each role are identified, and user group data is applied. In particular, the Principal Engineer role includes the TAMeb application entitlements associated with user groups A and B, and the Senior Engineer role includes those entitlements associated with user groups A and C.

Figure 6:
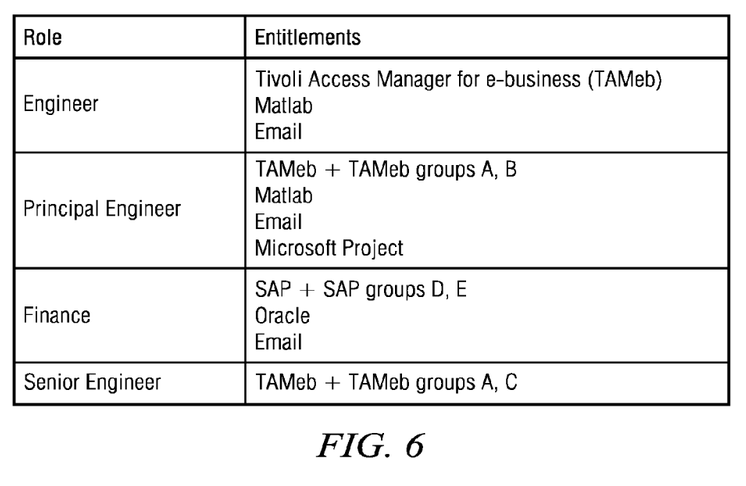
FIG. 6 illustrates an RBAC policy that is generated from the approach described in this disclosure.

Preferably, all or substantially all of the application directories in the organization are interrogated to ensure that the combined role policy (such as shown in FIGS. 5A-5B) can be determined. This XML snippet output can be represented by the RBAC policy shown in FIG. 6. In this example, when loading users into a dependent system (such as the identity manager 310, users Paul and Chris belong to the Principal Engineer role, and Chris and John belong to the Senior Engineer role. If necessary, an IT administrator may review the RBAC policy and make any final refinements as may be desired. Thus, for example, the administrator may rename an application name to ensure that the name matches a name used in systems that already consume this information. Additionally, the IT administrator may want to rename the role itself to something more familiar to an administrator of the identity manager.

As noted above, the RBAC policy is fed into an identity management system to create an initial role and entitlements policy for the organization or some defined portion thereof. A representative identity management system that may be used is IBM Tivoli Identity Manager.

Figure 7:
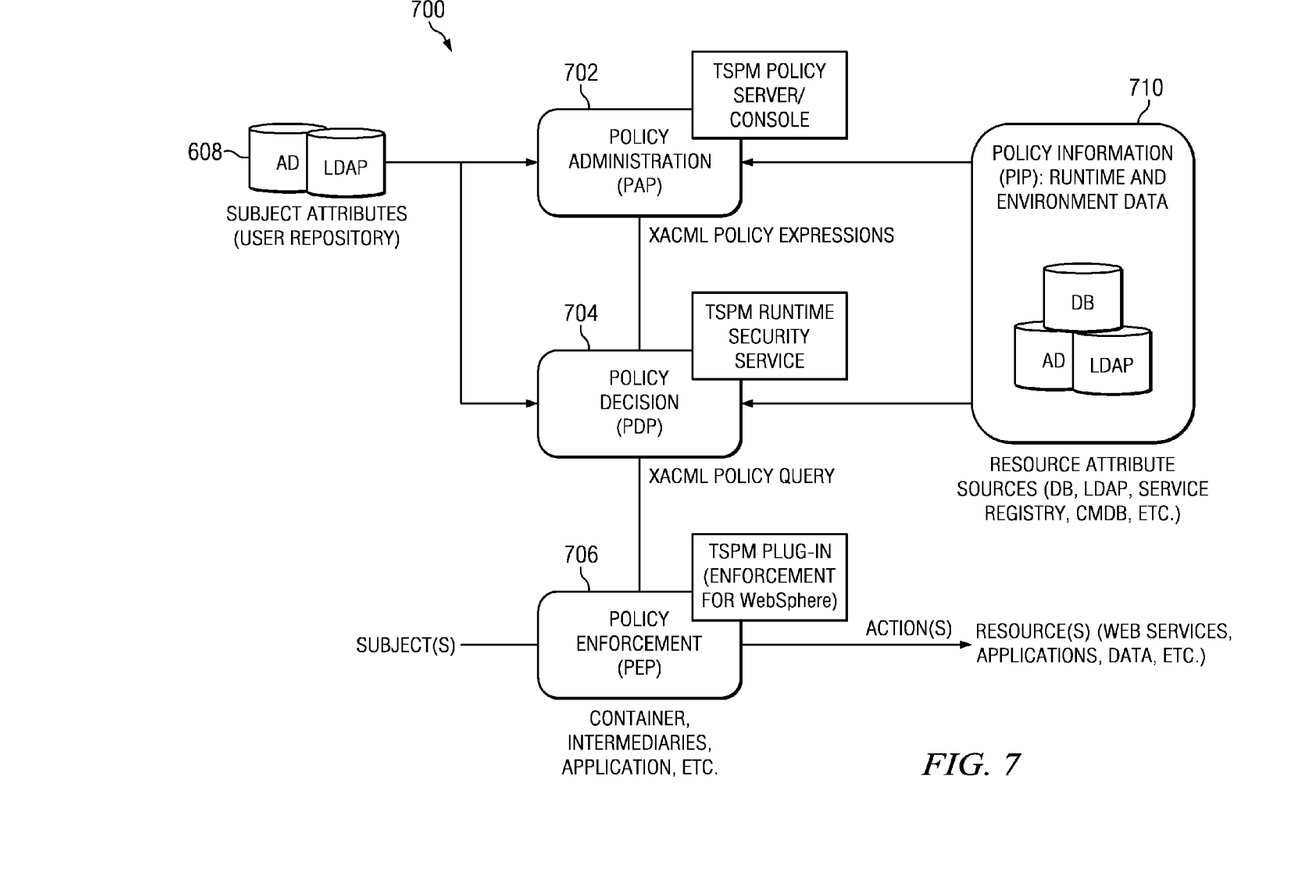
FIG. 7 illustrates a policy management system in which the RBAC policy may be implemented.

An end-to-end system implementation of this type may be conceptualized as illustrated in FIG. 7. This system is one that consumes a policy that has been created as a result of the network observations-generated RBAC. FIG. 7 in particular illustrates a representative enterprise policy management system 700. The system 700 may be implemented across one or more machines operating in a computing environment, such as shown in FIG. 1. Typically, the system comprises a policy administration point (PAP) 702, the policy decision point (PDP) 704, and a policy enforcement point (PEP) 706. Generally, the policy administration point 702 is used to define a policy, which may be specified as a set of XACML policy expressions. In the example scenario for this disclosure, the policy administration point comprises components 302, 304, 306 and 308 described above. As noted above, this policy uses subject attributes provided from a user repository 708, as well runtime and environment data received from policy information point (PIP) 710. The policy decision point (PDP) 704 (in this scenario the identity manager) receives similar information and responds to an XACML policy query received from the policy enforcement point (PEP) 706 to enforce the policy on a subject and with respect to a particular action initiated by the subject. The PDP 704 implements the policy decision.

Thus, according to this disclosure, network inspection techniques preferably are used to assess an initial set of roles and entitlements, which roles are then refined into a more fine-grained set of definitions using group and user relationship data obtained by interrogating one or more existing directories in the enterprise. This latter step helps to detect policy anomalies within the directory services, or within the collected traffic data. This approach (using directory information to help refine the role data determined by network traffic analysis) is advantageous, as the group information (e.g., the members of a particular group) within system directories may not always be correct and current, and it may therefore be unreliable for use in creating any initial set of roles. But such data is quite useful to help refine (as necessary) the initial set of roles and entitlements that are determined by the analytics engine.

The approach of this disclosure thus uses network intelligence to create a roles-based view of the enterprise. As has been described, the approach focuses on observing a user's behavior on one or more enterprise systems to determine a set of possible roles and their entitlements. The approach provides an automated way of discovering a set of roles and entitlements, as well as a low-cost method of creating an initial set of roles and entitlements. The approach is unobtrusive and can leverage existing computing machines, devices and functionalities. By leveraging network intelligence in the manner described, roles and entitlements are created based on real behavior rather than perceived behavior or documented policies. The approach also enforces a separation between the concepts of IT roles for application access and business roles. Once the RBAC policy has been generated as described, it may be readily applied in an identity management system to create an initial role and entitlements policy.

The role and entitlements mining functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The technique described herein also may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the endpoint identity and tracking functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the process flows described above are implemented in a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing intrusion detection system solution.

Without meant to be limiting, preferably a management server management console exposes one or more web-based interfaces that may be used to configure, manage and administer the role and entitlements mining system.

The described functionality may be implemented as an adjunct or extension to an existing identity management solution, product, or service.

While the above describes a particular order of operations performed by certain embodiments of the disclosed technique, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

Having described our invention, what we now claim is as follows.

The invention claimed is:

1. A method to generate a role-based access control (RBAC) policy, comprising:
   collecting traffic data from a computer network;
   based on the collected traffic data, identifying a user and an application being used by the user to generate role and entitlement mining data;

analyzing the role and entitlement mining data from multiple users and multiple applications to generate one or more candidate roles, wherein a candidate role is generated by an analytics engine executing on a hardware element and is defined by an identifier, one or more users, and one or more application entitlements; and generating the RBAC policy using at least the candidate role.

2. The method as described in claim 1 wherein the generating step comprises:

retrieving group and user relationship data; and using the retrieved group and user relationship data to augment the candidate role.

3. The method as described in claim 2 wherein the using step generates a role having a set of one or more application entitlements, at least one application entitlement being associated with a group identified from the retrieved group and user relationship data.

4. The method as described in claim 2 wherein the group and user relationship data is retrieved from a directory service.

5. The method as described in claim 4 wherein the directory service is one of: a directory service within an organization boundary associated with the computer network, and a directory service at least in part beyond an organization boundary associated with the computer network.

6. The method as described in claim 1 wherein the traffic data comprises source and destination network addresses, and application-layer information associated with at least one request.

7. The method as described in claim 1 wherein the role and entitlement mining data associates a user identifier, an application identifier, and a network address associated with a unique instance of the application.

8. Apparatus, comprising:

a processor;

computer memory holding computer program instructions that when executed by the processor perform a method to generate a role-based access control (RBAC) policy, the method comprising:

collecting traffic data from a computer network;

based on the collected traffic data, identifying a user and an application being used by the user to generate role and entitlement mining data;

analyzing the role and entitlement mining data from multiple users and multiple applications to generate one or more candidate roles, wherein a candidate role is defined by an identifier, one or more users, and one or more application entitlements; and generating the RBAC policy using at least the candidate role.

9. The apparatus as described in claim 8 wherein the generating step comprises:

retrieving group and user relationship data; and using the retrieved group and user relationship data to augment the candidate role.

10. The apparatus as described in claim 9 wherein the using step generates a role having a set of one or more application entitlements, at least one application entitlement being associated with a group identified from the retrieved group and user relationship data.

11. The apparatus as described in claim 9 wherein the group and user relationship data is retrieved from a directory service.

12. The apparatus as described in claim 11 wherein the method further includes probing the directory service, wherein the directory service is one of: a directory service within an organization boundary associated with the computer network, and a directory service at least in part beyond an organization boundary associated with the computer network.

13. The apparatus as described in claim 8 wherein the traffic data comprises source and destination network addresses, and application-layer information associated with at least one request.

14. The apparatus as described in claim 8 wherein the role and entitlement mining data associates a user identifier, an application identifier, and a network address associated with a unique instance of the application.

15. A computer program product in a non-transitory computer readable medium, the computer program product holding computer program instructions which, when executed by a data processing system, perform a method to generate a role-based access control (RBAC) policy, the method comprising:

collecting traffic data from a computer network;

based on the collected traffic data, identifying a user and an application being used by the user to generate role and entitlement mining data;

analyzing the role and entitlement mining data from multiple users and multiple applications to generate one or more candidate roles, wherein a candidate role is defined by an identifier, one or more users, and one or more application entitlements; and generating the RBAC policy using at least the candidate role.

16. The computer program product as described in claim 15 wherein the generating step comprises:

retrieving group and user relationship data; and using the retrieved group and user relationship data to augment the candidate role.

17. The computer program product as described in claim 16 wherein the using step generates a role having a set of one or more application entitlements, at least one application entitlement being associated with a group identified from the retrieved group and user relationship data.

18. The computer program product as described in claim 16 wherein the group and user relationship data is retrieved from a directory service.

19. The computer program product as described in claim 18 wherein the method further includes probing the directory service, wherein the directory service is one of: a directory service within an organization boundary associated with the computer network, and a directory service at least in part beyond an organization boundary associated with the computer network.

20. The computer program product as described in claim 15 wherein the traffic data comprises source and destination network addresses, and application-layer information associated with at least one request.

21. The computer program product as described in claim 15 wherein the role and entitlement mining data associates a user identifier, an application identifier, and a network address associated with a unique instance of the application.

22. Identity management apparatus, comprising:

one or more processors;

computer memory holding computer program instructions executed by the one or more processes to perform a method, the method comprising:

collecting traffic data from a computer network;

based on the collected traffic data, identifying a user and an application being used by the user to generate role and entitlement mining data;

analyzing the role and entitlement mining data from multiple users and multiple applications to generate to one or more candidate roles, wherein a candidate role is defined by an identifier, one or more users, and one or more application entitlements;
retrieving group and user relationship data; and
using the retrieved group and user relationship data to augment the candidate role;
generating a role-based access control (RBAC) policy using at least the candidate role as augmented by the retrieved group and user relationship data; and
enforcing an identity management decision using the role-based access control policy.

* * * * *